Feb. 17, 1970 W. LIMBERGER 3,495,693

PREDETERMINED STOP DEVICE FOR A REVOLVING MEMBER

Filed Jan. 3, 1968 8 Sheets-Sheet 1

Inventor:
WALTER LIMBERGER

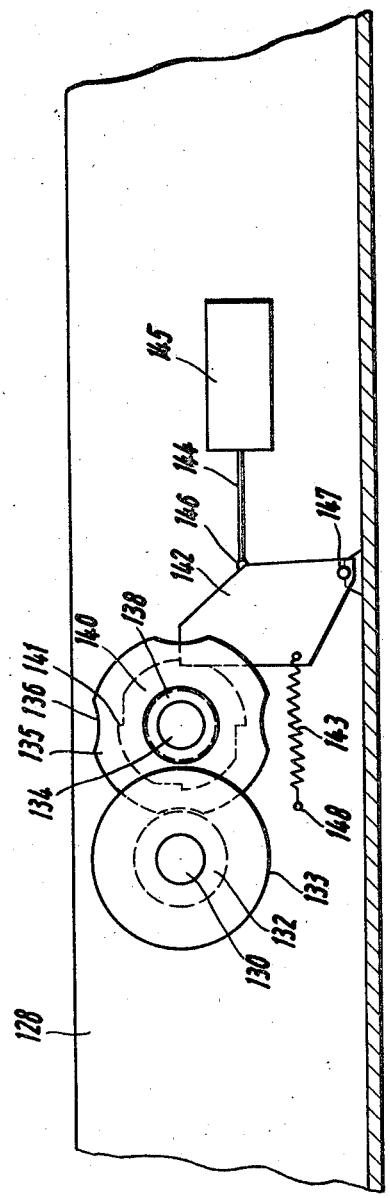

United States Patent Office 3,495,693
Patented Feb. 17, 1970

3,495,693
PREDETERMINED STOP DEVICE FOR A
REVOLVING MEMBER
Walter Limberger, Hamburg-Poppenbuttel, Germany, assignor to Lumoprint Zindler KG., Hamburg, Germany
Filed Jan. 3, 1968, Ser. No. 695,427
Claims priority, application Germany, Jan. 4, 1967,
L 55,430
Int. Cl. F16d 71/00; F16h 27/04
U.S. Cl. 192—148          14 Claims

ABSTRACT OF THE DISCLOSURE

An improved apparatus for controlling one or several operations, as a function of a triggering impulse, includes a constantly revolving shaft acting as a driving member and includes a control member engageable with the shaft, responsive to the impulse, and during a predetermined arc or angle of revolution of the control member. The apparatus includes improved means for insuring complete reliability of disengagement or disconnection of a control member from the driving member using exclusively mechanical means, and which require only a very small operating effort.

---

There are known so-called single-revolution clutch couplings which are disengaged automatically after one revolution. Such single-revolution clutch couplings can operate with rolling members as clutch members, adapted to enter alternatively from a cage into control or follower recesses. In this case, always the same torque is engaged.

The same also applies where the single-revolution clutch is merely a control disk, connecting another cltuch coupling to a drive equipped with a revolving shaft.

The take-off member may be stopped by cam control means; these members must be constructed to withstand considerable shocks in operation and it has therefore already been proposed to provide such clutch means with spring adapted to absorb these shocks.

Known control mechanisms of the type hereinbefore mentioned, comprising a continuously revolving driven member, which may have the form of a revolving shaft, are not suitable for producing a higher torque in the driving member. According to the power balance, with a higher torque on the take-off side, the speed, that is to say, the velocity of movement, would have to be reduced. Hitherto, these effects have been achieved only by interposing a gearing. It is not known in the art to establish directly a transmission in engagement with the driving and driven parts of a clutch coupling or control and to provide, in addition thereto, a control ensuring the absolutely reliable and controlled declutching while requiring very small actuating forces.

The invention has therefore the object of providing a control mechanism having the mentioned properties which are absent in known controls, combined with the additional advantage of achieveing a simple and cheap construction by exclusively mechanical means.

According to the invention, this object is realized in that the continuously revolving driving member and the control member are preferably equipped with different torque arms and are adapted to be brought into direct engagement, and the control member is so mounted that it is affected in the inoperative postiion by a driving force tending to produce engagement with the driving member, when an impulse for clutch engagement occurs.

In clutch couplings, the connection between parts having different torque arms on driving and driven sides is not known, particularly where rotational movements take place on both the driven and driving sides.

In a preferred embodiment of the invention, the control member is a disk adapted to be locked on a spindle mounted parallel to the axis of the driving shaft and having at least one peripheral recess in which the driving member can freely rotate, wherein the disk is affected by the driving force which tends to remove the peripheral recess out of the operating region of the driving member and to produce a force transmitting engagement between the periphery of the disk and the driving shaft.

According to one preferred embodiment of the invention, the driving force acting on the control member in the inoperative position is provided by a spring which is tensioned when the control member is stationary.

In another preferred embodiment of the invention in which a particularly small number of components is used, the driving force acting on the control member in the inoperative position is provided by friction provided by a friction wheel revolving with the driving member and cooperating with one side face of the disk-shaped control member.

The definition of the control member as a disk includes also a control member with a larger axial dimension such that the definition may be said to include shafts and sections of shafts. Correspondingly, the shaft forming the driving member may also have a shorter axial length and may thus be a disk which need extend only over the zone of engagement of the control member, if the shaft has no further object to fulfil.

The positive engagement may also be produced by friction. To this end, the driving and control members may be equipped with elastic surfaces with high coefficients of friction. In addition the control and driving members may also be so spring loaded that both members are pressed together. Moreover, the frictional engagement may be further improved by providing at least one of these two members with a serrated or knurled surface which engages into the elastic shell of the co-operating part.

According to a further preferred embodiment, a toothing may be provided between the control member and driving member, and be recessed within the zone of the peripheral recess, but ensuring that the engagement occurs with release of the spring tension without the occurrence of sudden impacts, possibly by designing the teeth on either side with gradually increasing heights and possibly with gradually changing slopes of the tooth flanks.

It is important for the invention that the driving and driven shafts are not mounted co-axially as in known clutch couplings, but that the force amplification is also based on the parallel arrangement between driving and driven shafts, wherein torque arms are formed by the peripheral extent of interengaging wheel or disk-shaped parts.

In yet another preferred embodiment, the disk is associated with a releasable click-stop device which retains, during engagement, the disk with tension spring in a position in which a peripheral recess is aligned with the drive shaft. In view of the spring the click-stop device forms an essential feature of the invention. The spring tension may also be provided by a single spring if several click-stop devices are so distributed over the periphery that the spring is always tensioned when one click-stop device is in engagement.

Preferably several peripheral recesses and several corresponding click-stop means are equiangularly distributed over the periphery of the disk. This enables an accurate control to be achieved of the motional arcs of rotation, particularly with differently dimensioned torque arms. Thus, the larger diameter of the disk causes a force amplification during positive engagement. This is another essential feature of the invention.

In a preferred embodiment, the control member is combined with at least one cam disk.

In another preferred embodiment of the invention, the control member drives an accumulator, mounted on a crank and so dimensioned that the crank, connected with the accumulator, may be moved by the control member during one impulse triggered movement into a position in which the accumulator is tensioned, and a second actuation of the click-stop device releases the accumulator and the driving torque is reinforced by the accumulator. This additional feature of a further force amplification characterizes the invention in that a small mechanical torque introduced at high velocity, i.e. at high shaft speed, carries out a control movement over a limited path with considerable force, wherein this greater force can actuate a special, stronger accumulator for triggering off an operation.

In yet another preferred embodiment of the invention, the disk-shaped driving member is associated with two control disks which can be actuated successively. Thus, several control operations may be effected, possibly with different force amplification, and the actuation may be arbitrary or functional. In the latter case, the click-stop device of a second control disk is adapted to be actuated by a cam of the first control disk.

Under the assumption that the output of the driving shaft is constant, the construction according to the principles outlined above enables suitable connections to be made combined with power steps for different drives.

Obviously several control disks may be arranged and may be adapted to be alternatively disengaged and positively engaged by cam controls at certain predetermined intervals.

The invention will be further described by way of example with reference to the accompanying drawings and the appended claims.

In the drawings:

FIGURE 8 is a partial side elevation of the embodiment of FIGURE 7 in center cross-section.

Figure 1:
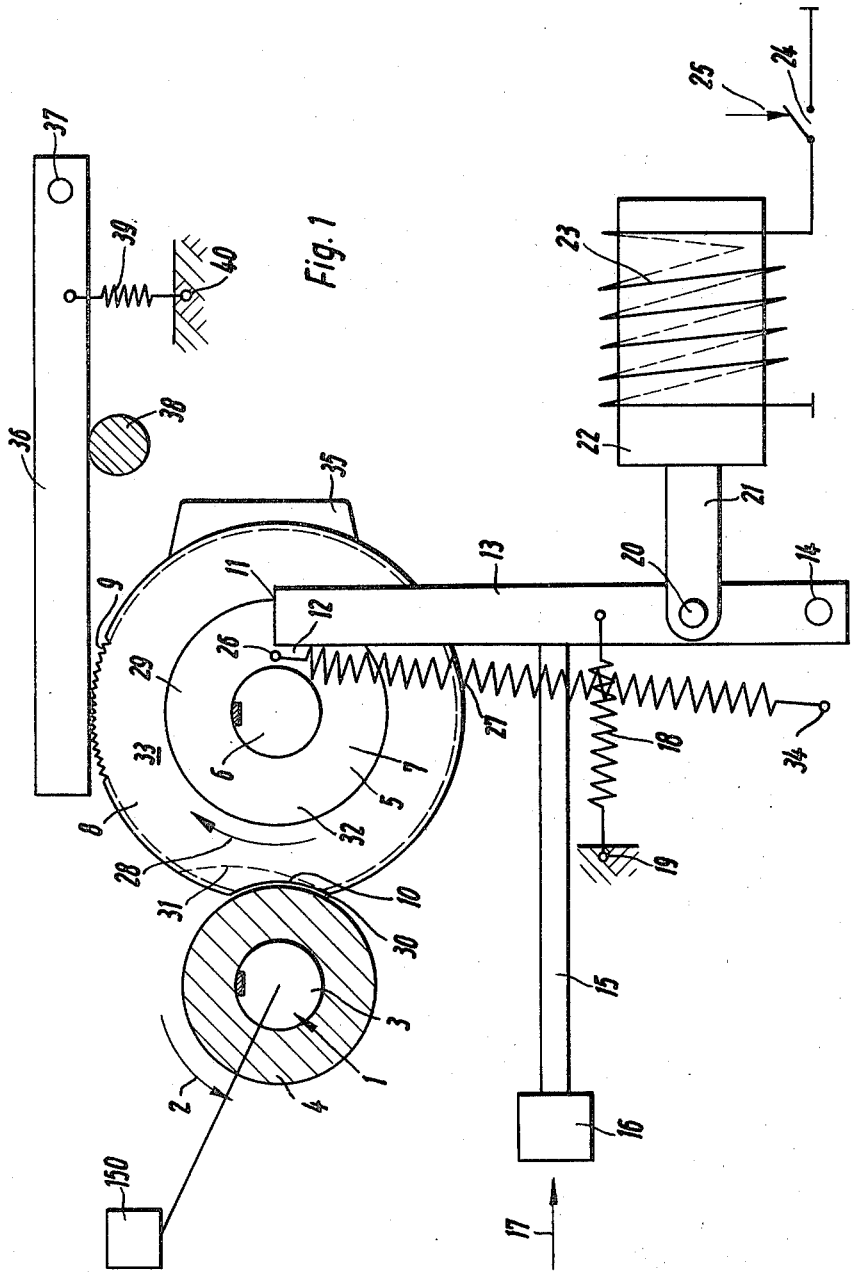
FIGURE 1 is a diagrammatic side elevation of a simple embodiment of the invention.
Figure 2:
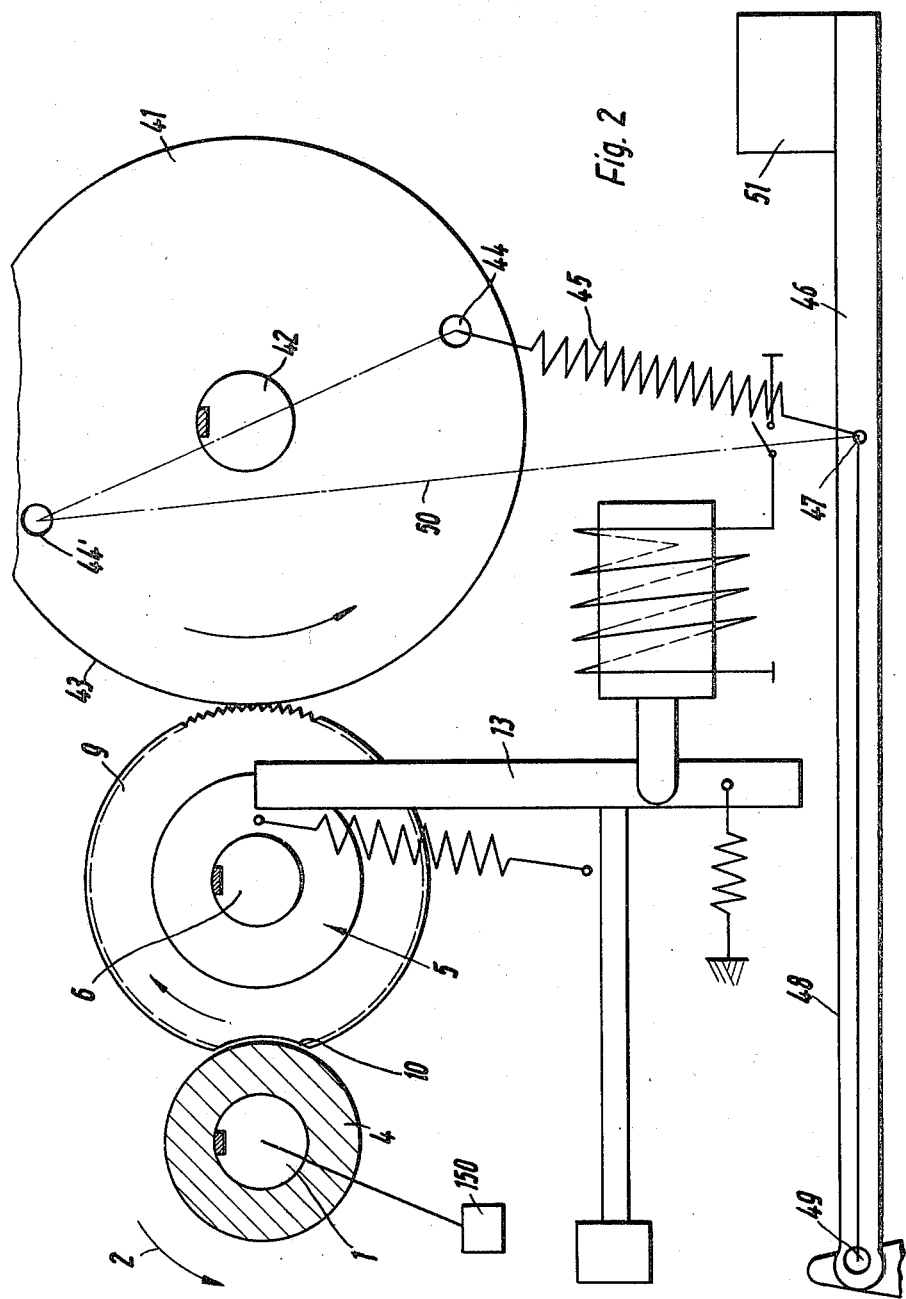
FIGURE 2 shows an embodiment of the invention as in FIGURE 1 comprising an additional accumulator for increasing the actuating force.
Figure 3:
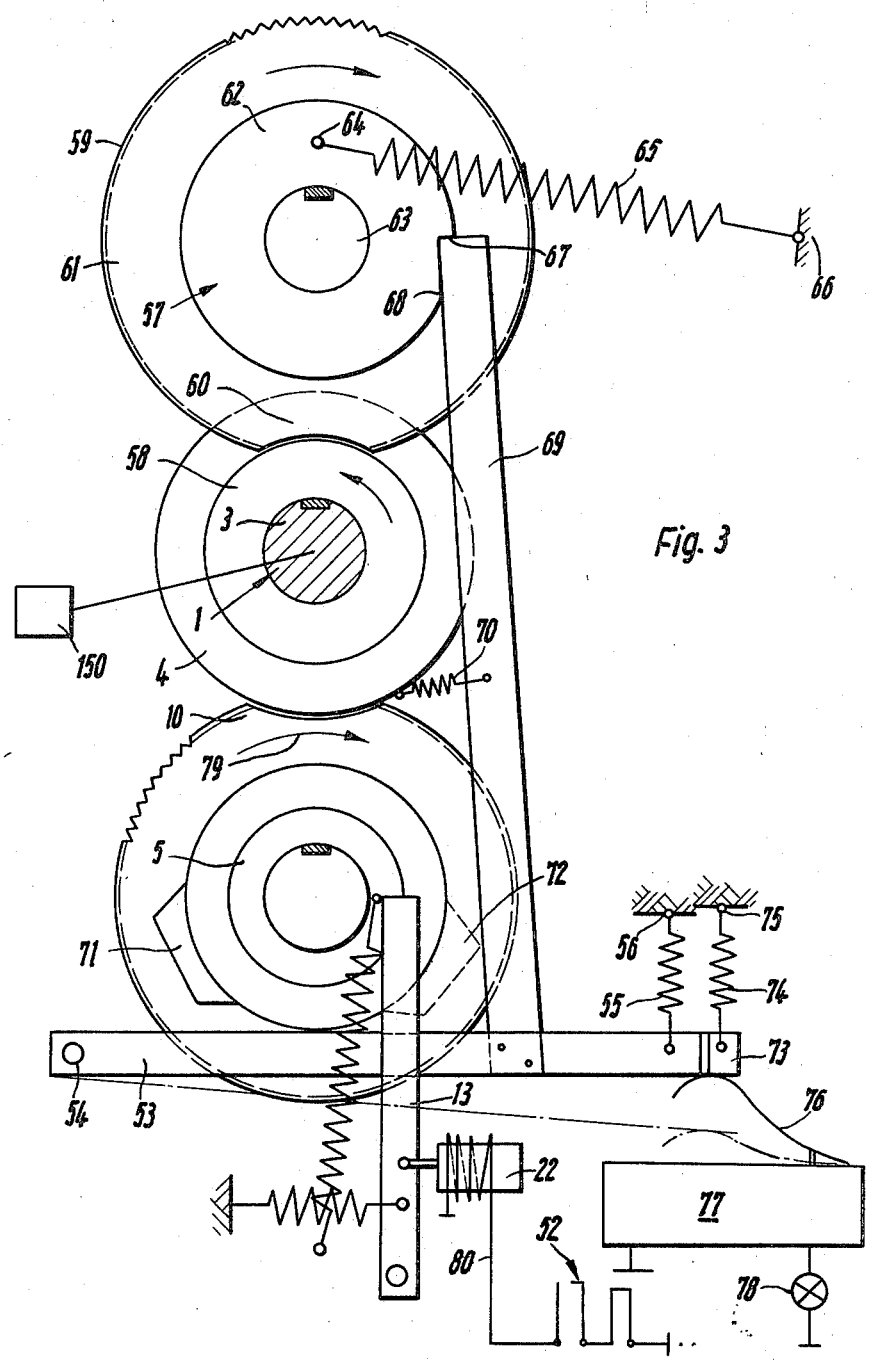
FIGURE 3 is a further modification of the FIGURE 2 embodiment comprising two control members adapted to be actuated alternatively.

FIGURES 1 to 3 show the invention diagrammatically in side elevation and in different planes. The drawing shows only the parts necessary for understanding the invention in their mutual arrangement. For example, a mounting plate is located in the plane of the drawing.

Also FIGURES 4 to 7 show merely and diagrammatically the arrangement of the parts in order to demonstrate the operation. However, these figures indicate sections of mounting walls with the possibilities for a mounting which may also be applied to the embodiments of FIGURES 1 to 3 in which shafts and pivot pins are mounted in suitable parallel mounting walls and the remaining parts are arranged on brackets on these mounting walls.

The driving member is shown in all figures at 1 and is drawn in end view in the form of a shaft; the length of this shaft is not specified and it can be reduced possibly to the dimensions of a disk. The said driving member 1 consists of an actual core 3, rotatively driven in the direction of the arrow 2, and a shell 4, made preferably of a material with a high coefficient of friction, and which may also be elastic. This shell may be of synthetic resin.

The shaft core 3 is rotatively mounted in frame means, not shown in detail, and may be driven by a motor 150, either directly or via a transmission. The motor 150 is adapted to be switched on by a main switch.

The control member 5 or the take-off member of the clutch is mounted on a shaft 6 which is mounted freely rotatably in the frame. The control member may have, for example, a disk-shaped, annular projection 7 mounted rigidly on the core 6, and a shell 8 surrounding the same. The outer periphery of the shell 8 is knurled as at 9, thus forming an improved and slip-free engagement with the shell 4. Preferably the shell 8 is made of a resiliently compressible material.

Within the shell 8 is a peripheral recess 10 of arcuate configuration, the arcuate bottom of which has preferably a radius of curvature slightly greater than that of the outer periphery of the shell 4.

The projection 7 is extended laterally beyond the shell 8 and has a cam face 11, forming part of arrangements referred to generally as click-stop device. The cam face 11 is adjacent to a lateral recess 12. The click-stop device comprises further a stop lever 13, mounted pivotably about a pivot pin 14 located in the said main frame, not shown. Obviously, the stop lever and the stepped recess need not be positioned exactly radially relative to the shaft core so as to facilitate engagement or disengagement.

The stop lever 13 may be disengaged by a link rod 15, guided in the frame and equipped with a push button 16, actuable in the direction of the arrow 17 in order to disengage the stop lever 13 from the stepped recess 11.

In addition thereto, the lever 13 is affected by a tension spring 18, mounted at 19 in the main frame and tending to pull the stop lever 13 into the engaged position in which it is located under the stepped surface 11.

Alternatively, the stop lever 13 may be pivotable about a pivot 20 and may actuate the piston rod 21 of the armature of an actuating or electromagnet 22 the field winding of which may be switched on by a switch 24. If the switch 24 is operated in the sense indicated by the arrow 25, the excitation—even if only in the form of impulses—causes the stop lever 13 to be withdrawn from the stop face 11. The shaft core 6 or the projection 7 have mounted thereon in spaced relation from the center of rotation a fixed point 26 for an accumulator 27 whose other end is fixed firmly and stationarily at 34, for example to the main frame. In the embodiment shown, the accumulator is a tension spring 27 which is tensioned in the position shown in the drawing. It is important that the position shown in the drawing, representing the locking position, should be such that a movement of the control member 5 out of this position enables the accumulator 27 to be released.

The operation of the device shown in FIGURE 1 is as follows:

If the push button 16 is depressed in the direction of the arrow 17, or the switch 24 is closed for a short period as shown by the arrow 25, the stop lever 13 is disengaged from the stepped face 11. The spring 27 contracts and moves the recess 10 so that it is no longer axially aligned with the driving member 1, that is to say, the knurled or serrated surface 9 makes engagement with the shaft shell 4. The mutual compressions ensure adequate engagement enabling the torque to be transmitted without slipping. The fixed point 26 is naturally entrained in a clockwise direction so that the release of the accumulator 27 is followed by a tensioning until it passes beyond the culmination point of the control member 5.

The periphery 29 of the projection 7 forms a cam surface on which the top lever 13 rides; consequently, in the end the stop lever 13 necessarily reaches again the stepped surface 11 after the member has passed through a full revolution through 360°. However, at this point, the force is small and the drive is positively disconnected, because the shell 4 of the drive member 1 re-enters into the peripheral recess 10. The engagement of the click-stop device comprising the surface 11 and the stop lever 13 produces firm braking after reliable disengagement of the members.

For producing a driving engagement during a revolution of the driving member (arrow 2) and control member (arrow 28) it is essential that this engagement be made at the point 30. For this reason, the peripheral recess 10 is non-symmetrical relative to the axial connection between drive member 1 and control member 5, as shown by the dotted line 31, such that it extends further in the direction of the rotation, corresponding to the arrow 28 in the control member 5 than on the other side, relative to the imaginary axial connection (line 32), i.e., the recess is arranged asymmetrically relative to the engaged position in such a way that it extends further and deeper in the driving direction.

This feature is essential since the positive engagement between the drive and control members 1 and 5, respectively, ceases to exist, before the control member reaches the locked position shown in the drawing. It must be taken into consideration that the peripheral recess corresponding to the line 31 must be shorter than the arc through which the fixed point 26 moves from the upper dead center position 33 to the locked position, relative to the other fixed point 34. Thus, in the construction shown, the peripheral recess 31 must be smaller than 90°, because the angular distance between top dead center and locking position of the stop lever amounts to 90°.

Although the positive engagement between driving member 1 and control member 5 ceases when the leading edge of the recess 31 runs into the driving member 1, in this arrangement the accumulator 27 continues to pull the control member 5, because the fixed point 26 moves in the zone of its maximum deflection relative to the connecting line between the fixed point 34 and the center of the shaft core 6, resulting in an accurately defined locking position.

A cam disk with a cam 35 is mounted coaxially to the periphery 9 on the shaft 6. A control lever 36, rotatable about a pivot 37, is arranged in the plane of the cam. The pivot is mounted in the main frame, not shown in the drawing, which also contains a support rod 38 against which the cam lever 36 is pulled by a spring 39, the other end of which is anchored in the frame at 40.

Obviously, the cam 35 will lift the cam lever 36 when passing thereunder, triggering off a control function, not described in detail.

Obviously, several cam followers or control levers, such as 36 may be arranged side by side. Where several cam disks, possibly with mutually offset cams, are arranged side by side, alternating controls may be effected, but these terminate always when the stop lever 13 engages under the stepped surface 11.

In FIGURE 2, the parts corresponding to those in FIGURE 1 are designated with the same reference numerals. Also here, the main frame is not shown in detail, since its arrangement and function are clearly apparent from the drawing.

As shown in FIG. 2, a wheel 41 is mounted on a shaft 42 which is, in turn, mounted rotatably in the main frame. Between the said shaft or spindle 42 and the shaft 6, there may be provided a transmission, not shown in detail in FIGURE 2, for example, a gearing, a rope or belt pull or the like. However, the periphery 43 of the wheel 41 may also engage directly the, for example knurled, periphery 9 of the control member 5. If the peripheral recess 10 matches exactly the radius of curvature of the shell 4, the positive driving engagement between the control member 5 and the wheel 41 would not be broken even when the peripheral recess 10 reaches the periphery 43 of the outer shell of the wheel 41, because the diameter of the wheel is larger than that of the control member. The invention includes also a solution wherein engagement is effected by friction, which may be reinforced by a knurled or serrated configuration of the interengaging parts, or by toothed engagement.

The wheel 41 is a real power amplifier. It has a larger diameter than the control member 5. If a force transmission were provided between the shafts 6 and 42, the wheel 41 could be replaced by a crank lever or crank arm. In this construction it is important that a fixed point is located on the periphery of the wheel 41, or at the end of the crank; this fixed point 44 forms one anchorage for an accumulator 45, the other end of which is anchored to a functional member 46 as at 47. The functional member 46 is mounted, in this embodiment, on a pivoting lever 48, pivotable about a pivot 49, located in the main frame, not shown.

In the starting position, the fixed point 44 is in the position shown in the drawing, in which the accumulator is already slightly tensioned. Given a suitable relation of the diameters (doubling) of control member 5 and wheel 41, the fixed point 44 would be in the position 44', when the control member 5 returns to its inoperative position. Then, the fixed point 44 would be pulled beyond top dead center into the position 44' so that, when the control member 5 is again actuated, the release of the accumulator, extending in this case along the line 50, would pull the wheel 41 into the starting position. Thus, in this case, the last part of the release of the accumulator spring could contribute to the controlled return into the starting position, if the peripheral recess 10 were profiled in accordance with the configuration represented by the line 31 in FIGURE 1.

It may be seen that a multiple force amplification is effected and that the stop lever 13 carries out a control movement which not only release the control measured in the arc of rotation, but which also enables several accumulators to be used, wherein the change of the profile makes it possible to achieve absolute standstill in the starting position.

Obviously, the wheel 41 is suitable for controlling cam levers, corresponding to the cam lever 36 in FIGURE 1.

Furthermore, the functional member 46 may be used for actuating a load 51 or for any other task to which a pivoting lever such as the lever 48 may be adapted.

FIGURE 3 shows yet another embodiment. Here again, the same reference numerals designate the same parts as in FIGURE 1 and these parts have again the same functions. The switch 24 has been replaced by a contact unit 52. In addition, the cam arrangement 35 has been replaced by another cam arrangement, the purpose of which will be explained further below.

The control lever 36 in FIGURE 1 is shown in FIGURE 3 at 53; this lever 53 is pivotable about a pivot 54, mounted in the main frame, not shown, and is suspended from a spring 55, the other end of which is mounted on the main frame at 56.

The driving member 1, cooperating with the outer periphery of its shell 4 with the control member 5 or the suitable knurled periphery with a peripheral recess 10, is associated with a second control member 57. For driving this second control member 57, the shaft core 3 carries a disk 58 with an unbroken periphery, whilst the outer periphery 59 of the control member 57 has a recess 60 which corresponds to the periphery of the disk 58. The recess 60 may be varied as shown with reference to the peripheral recess 10 by the dotted line 31 in FIGURE 1.

The periphery 59 of the control member 57 may be serrated or toothed, and is formed as the periphery of an outer shell 61. The shell 61 is mounted on a hub 62 mounted firmly on a shaft 63 which forms the mounting for the second control member 57. All these parts are again mounted in the main frame, not shown. The hub 62 is equipped with an anchorage 64 for an accumulator, e.g., a tension spring 65, the other end of which is anchored stationarily on the main frame. The hub 62 has a stop notch with a stepped surface 67, which corresponds to the surface 11 in FIGURE 1. Adjacent to this stepped surface, the hub is recessed as indicated by the line 68, and a stop lever 69 engages into this recess. In this particular construction, the stop lever is mounted on the control lever 53 so that the spring 70 actuating it augments the spring 55, or one of the springs may be omitted.

It should be mentioned in this connection that, for example, the control lever 53 may be actuated by the cam 71 of the first control member 5. This first control member 5 has a cam 72 located in another plane which actuates a lever arm 73 (only one end of which is shown in the drawing), suspended on a spring 74, the other end of which is anchored in the frame as at 75.

Both control levers 53 and 73 act on the actuating lever 76 of a switch 77, adapted, for example, to switch a light source 78 on and off.

If now, for example, the switching magnet 22 is energized by operating the contacts 52, and the stop lever 13 is disengaged, the control member 5 is entrained in the direction of the arrow 79. In accordance with this rotation, the cam 72 first actuates the control lever 73, causing the source to be switched on. The switch may contain a delay member with any desired time constant.

Then the cam 71 engages the switching lever 53. This actuation also acts on the actuating lever 76, for example, so that the light source 78 is again switched off. Simultaneously, the cam 71 causes the stop lever 69 to pivot, causing the control disk 57 to start and further switching actions can be performed under the action of the release of the accumulator 65. In view of the ratios between the diameters and of the cam arrangements shown, the control member 57 continues to revolve when the cam 71 has already returned into its starting position of FIG. 3 and the spring accumulator 55 tends to move the control lever 53 back into its starting position. Then the upper end of the stop arm 69 rides on the periphery of the disk 62 until it engages into the stop formed by the stepped surface 67. As can be seen, the shaft 63 of the control member 57 may carry further cam controls which can switch the switching means 52 so long as the control member 57 continues to revolve so that the whole operation can be continuously repeated. Thus, if such an operation is to be interrupted, the circuit with the switch 52 can be equipped with an additional switch which opens the circuit 80 as required.

However, the arrangement of FIGURE 3 shows in principle the wide adaptability of the control, and especially that the first control disk 5 can again be released after it has come to a standstill, when the first control disk has caused a corresponding control disk 57 to make positive engagement in time. Furthermore, the force transmission engagements include always the torque transmissions according to the invention. Moreover, although FIGURE 3 illustrates a 180° arrangement of the control members 5, 57, other arrangements with more control members are also possible. For example, three control members may be provided, offset angularly always by 120°. Furthermore, the driving peripheral surfaces 9, 59 may be offset relative to each other in the axial direction so as to produce, with the diameters to be chosen for the driving members, certain changes in the rotational paths with corresponding adaptation of the torque.

With regard to the example just described, the source may be held energized so long as the control member 57 continues to revolve after an initial rotation of the control member 5.

Figure 4:
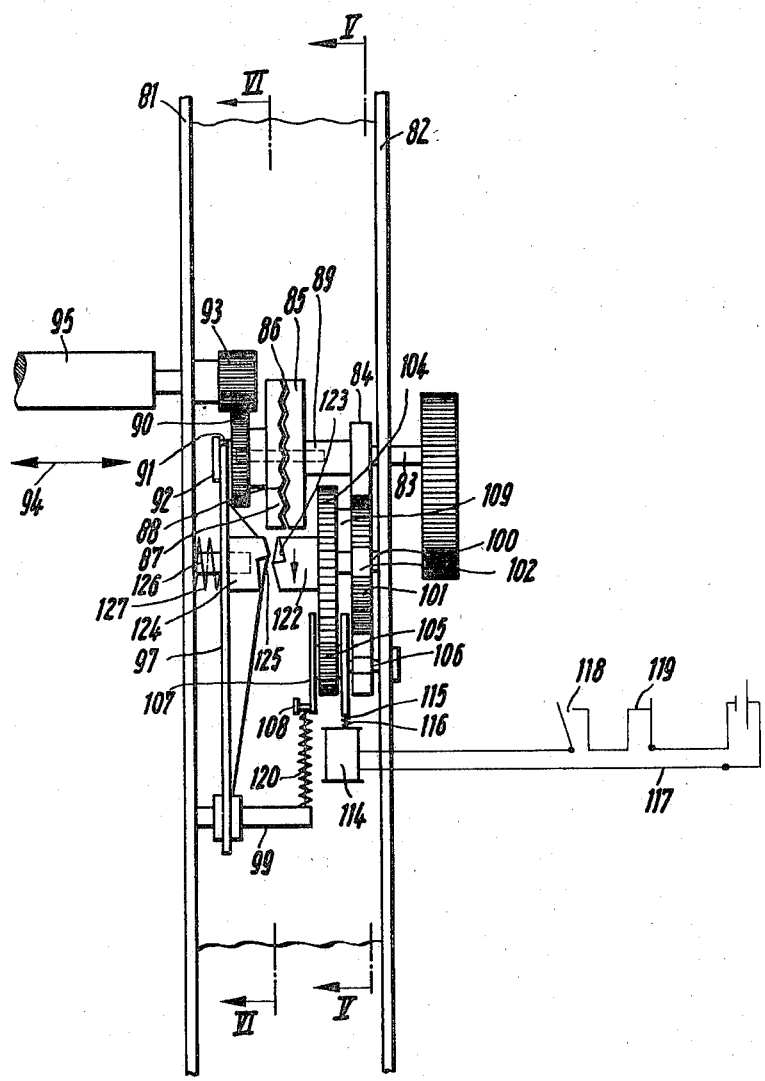
FIGURE 4 is a top view of a further embodiment of the invention.

FIG. 4 shows another embodiment, in which the parts are mounted on two mounting walls or partitions 81, 82 connected for example by a base plate located in the plane of the drawing. This base plate may have mounted thereon intermediate bearings, not shown in detail, and forming additional supports for shafts or stub shafts, extending between the supporting walls.

This construction comprises a driving shaft 83, which may be driven directly by a motor 151 or may have a driven pinion, as shown in the drawing. On the inside of the mounting wall 82, the shaft 83 carries a disk-shaped driving member 84, constructed in this embodiment after the manner of a friction member, and a drive disk 85 of a clutch coupling with an axially extending toothing 86. The driven disk 87 of the clutch coupling has a corresponding toothing 88 facing the drive disk, and may be movable axially to the shaft 83 on a spindle 89, shown by dotted lines. This spindle or pin 89 is fixed on a wider end portion of the shaft 83 and extends into a blind bore in the hub of the driven disk 87. A gear 90 and a control lug 91 with an expanded head 92 are firmly mounted on the hub.

The gear 90 meshes with a pinion 93, the width of which is such that the engagement is maintained also during the reciprocating movement of the driven disk 87 of the clutch coupling in the direction of the arrow 94. The pinion may drive, for example, a roller 95, by means of a shaft mounted in the mounting wall 81.

Figure 6:
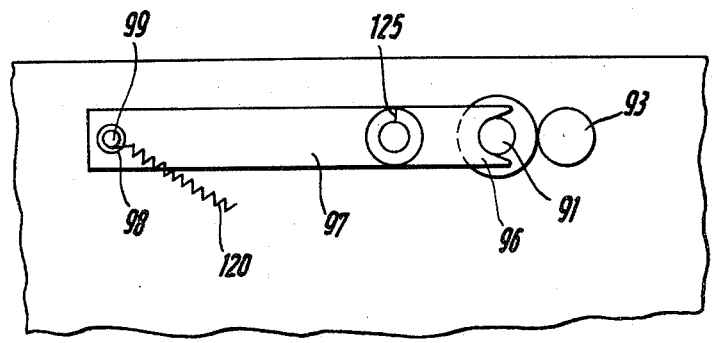
FIGURE 6 is across-section along the line VI—VI in FIGURE 4.

The forked end 96 (FIG. 6) of a clutch actuating lever 97, mounted at the other end by means of a hole 98 on a pin 99, engages the lug 91. The pin 99 is located in the mounting wall 81. As shown in FIGURE 6, the hole 98 has a larger diameter than the pin 99 so that the clutch actuating lever 97 may be pivoted to and fro in the plane of FIGURE 4, i.e., in the direction of the arrow 94. During this movement, the forked end 96 is held on the lug 91 by the head 92.

The mounting wall 82 contains further a shaft 100. This shaft carries a disk-shaped control member 101, having, for example, four peripheral recesses angularly spaced by 90° from each other, and one of which is shown at 102. In this position, another peripheral recess 103 (FIG. 5) faces the drive member 84, having the form of a friction wheel. The peripheral recesses are so formed that the friction wheel 84 is not engaged when faced by a recess, but makes engagement when the periphery of the disk-shaped control member 101 between the said recesses comes into the range of the friction wheel 84. The gear 104 is mounted firmly on the shaft 100, at least relative to the control member 101, and meshes with another gear 105, mounted on a shaft 106 in the mounting wall 82. On this gear, there is located a crank 107, for example in the form of a disk, and having a crank pin 108 (see also FIG. 5). In the embodiment shown, a disk-shaped stop lug 109 is arranged between disk-shaped control member 101 and the gear 104; this stop lug has several stop stages 110, 111, etc., corresponding to the recesses 102, 103, etc., and arranged at the same angles. Thus a stop lever of pawl 112 may be mounted freely pivotably about the shaft 106. This pawl may engage by means of a suitably formed edge 113 into a stop. Thus, for example, an actuating magnet 114 may be mounted on the wall 82 so that its armature engages the pawl 112 through a rod 115 (FIG. 5) in order to disengage it. Between the body of the magnet 114 and the pawl 112, there is a compression spring 116 which urges the pawl 112 in the direction of the lug 109, when the magnet is de-energized in order to prepare an engagement into the next stop 111.

The magnet may be energized for example in impulses by means of a circuit 117. Two switches 118, 119 may be provided for forming the impulses and may be actuated by a paper strip running from the left over the switching levers. The leading edge of this paper closes the switch 118 and opens during its further movement the switch 119 so that, with tight sequential arrangement of the switches an impulse is generated which depends only on the velocity of the paper. After the passage of the trailing edge of the paper, both switches return into the position shown in the drawing.

Figure 5:
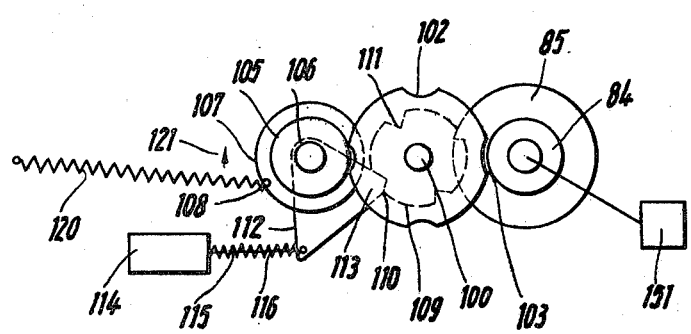
FIGURE 5 is a cross-section along the line V—V in FIGURE 4.

The crank pin 108 is affected by a tension spring 120, the other end of which is anchored to the pin 99. FIG. 5 shows that in a locked state of the arrangement, for example, with the pawl 112 engaged into the stop 110 and with the recess 103 in front of the friction wheel 84, the crank pin is offset relative to the connecting line between the shafts 106 and 102 in the direction of rotation opposite to that of the crank disk 107. The rotation of the crank disk 107 is indicated by an arrow 121, indicating that, with disengagement, the spring 120 pulls the crank disk 107 in the direction of this arrow 121 and causes the periphery of the disk-shaped control member 101 to engage the friction wheel 84. The transmission of the movement is effected by the gears 104 and 105.

On the shaft 100, there is, in the axial extension to the left of the gear 104 a ram pin 122 (as viewed in FIGURE 4), having on its end face an axially extending cam profile. The cam profile comprises two steps, offset relative to each other through 180° and of which one is shown at 123. Between the uppermost and lowermost edges of the steps, the surface of the cam has a helical configuration.

The clutch actuating lever 97 has, in the axial extension of the pin 122, a corresponding pin 124, the end face of which is provided with a mating cam profile. This cam has only a single step 125, between the upper and lower edge of which the surface of the mating cam has a helical configuration.

A guide pin 126 is mounted in the mounting wall 81 and extends into a blind bore in the pin 124; this guide pin serves to guide the clutch actuating lever. Between the clutch actuating lever 97 and the mounting wall 81, there is a compression spring 127 which pushes the clutch actuating lever to the right as in FIGURE 4 so as to engage the clutch coupling.

As shown, the cams 125 and 123 are so offset relative to each other, that this is possible.

When the magnet 114 is energized by means of an impulse, the pawl 112 is disengaged, the spring 120 moves via the gearing 104, 105, the recess 103 out of the operating region of the friction wheel 84, and the latter drives therefore the control member 101. This causes the cam pin 122 to rotate in the direction of the arrow in FIGURE 4, and the lever 97 is moved to the left against the force of the spring 127. The clutch is disengaged. This movement continues until the pawl 112, urged by the spring 116 towards the disk-shaped stop lug 109, engages into the next stop 111. At this moment, the next peripheral recess of the disk-shaped control member is opposite the friction wheel 84 so that the whole arrangement stops. Due to the ratio of the gearing 104, 105, the crank disk 107 with the crank pin 108 has also returned into the starting position.

With the next energization of the magnet 114, the whole operation is repeated, but, owing to the two steps being offset by 180°, the cam pin 122 returns practically into its starting position when the arrangement is next stopped so that the spring 127 moves the clutch actuating lever 97 so as to engage the clutch coupling 85, 87.

It may be seen that the operation is such that one energization of the magnet 114 cancels the existing state, and the new state is maintained until it is terminated by the next actuating impulse. Moreover, the clutch engagement is not produced by the control forces of the magnet, but by the spring 127, whilst the pitch of the helical cam surfaces ensures a very low control load. The drive for the intermittently revolving roller 95 is taken directly from the main drive.

Figure 7:
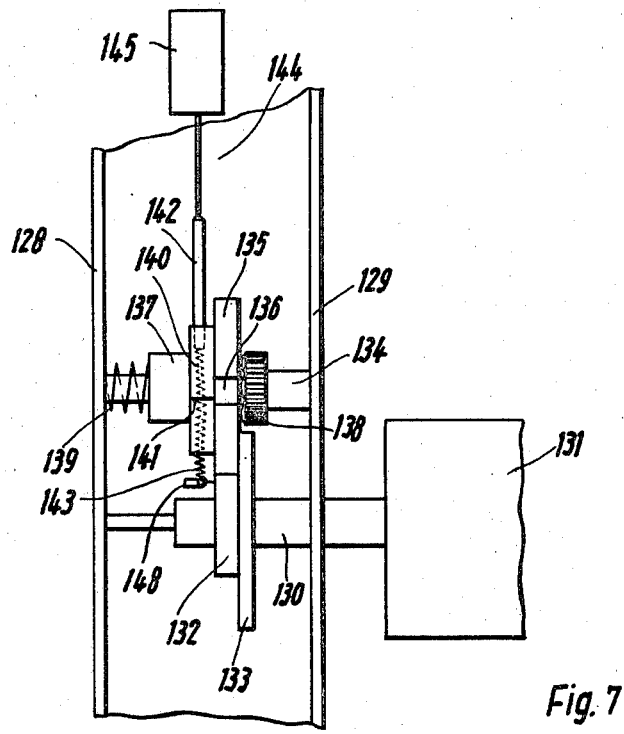
FIGURE 7 is a top view of yet another embodiment of the invention.

In order to avoid, in another embodiment, that the spring 120 must be tensioned always by a movement of a crank, an arrangement may be provided of the kind illustrated in FIGURES 7 and 8. In this embodiment, a drive shaft 130, which may be driven continuously by a motor 131, is mounted in the mounting walls 128, 129. This shaft has mounted thereon rigidly a continuously revolving friction wheel 132, acting as driving member. A friction disk 133, which may have the shape of a stepped projection, is provided on the side face of this friction wheel.

A shaft 134 to be controlled, and carrying a rigidly mounted disk-shaped control element 135, is mounted in the frame walls. This control element is equipped with recesses of the kind hereinbefore described, such as shown at 136 and another shown opposite the friction wheel 132. The friction wheel 132 may be mounted, by means of a hub 137, nonrotatably, but to some extent axially displaceably, on the shaft 134, which also carries a rigidly mounted pinion 138. Between the mounting wall 128 and the hub 137, there is a compression spring 139 which presses the disk-shaped control member arrangement on to the pinion 138. A plate spring or elastic washer may also be located between the pinion and the control member 135. The relation between the disk-shaped control member and the friction wheel 132 with the friction disk 133 is such that the right-hand side of the disk-shaped control member 135 (as viewed in FIG. 7) is pressed on to the friction disk 133.

The sub 137 carries a stop lug 140 with four stops, each associated with one peripheral recess 136, and one of which is shown at 141. A ratchet pawl 142 is mounted pivotably about a spindle 147, located in the walls, and adapted to engage into a stop 141, when one of the peripheral recesses 136 is opposite the friction wheel 132 and prevents driving engagement. The pawl 142 is pulled into the engaged position by a tension spring 143, mounted in the frame at 148, for example on a lug. In addition, it is affected by a pull rod 144 of an actuating magnet 145, articulated to the pawl at 146. The magnet corresponds functionally to the magnet 114 in FIGURE 4.

If the magnet is energized in impulses, the pawl is disengaged from the corresponding stop. The friction disk 133 entrains the disk-shaped control member 135, producing a stronger driving engagement between the periphery of the disk-shaped control member 135 and the friction wheel 132 so that force is transmitted from the motor 131 to the pinion 138. During the rotation, the pawl 142 returns to the periphery of the stop lug, causing it to engage automatically when the next stage is available or the next recess comes within the operating range of the friction wheel 132. Then the pinion stops until the next impulse occurs.

The device of FIGURE 7 is characterized by an even smaller number of component parts and eliminates in particular the tension spring on a crank, provided to establish driving engagement. This effect, replaced in FIG. 7 by lateral friction, may also be used in the embodiments illustrated in FIGURES 1 to 4 and be combined with the control means shown there.

I claim:

1. In apparatus for controlling at least one operation as a function of a triggering impulse, and of the type including a continuously rotating driving member and a rotatable operation control member, with the control member being operatively connected to the driving member, for a predetermined angular rotation of the control member, responsive to a triggering impulse, the improvement comprising, in combination, a driving shaft carrying said driving member; said driving and control members being directly interengageable for direct transmission of torque therebetween, the torque arm of said driving member, which is directly effective on said control member, differing from the torque arm of said control member, which is directly effective on said driving member; said driving and control members having an inoperative, completely disengaged position; mechanical biasing means connected to said control member and effective, in said disengaged position, to exert an actuating force on said control member tending to rotate said control member from said disengaged position into driving engagement with said driving member for rotation by the latter; and mechanical stop means effective on said control member, in said disengaged position, to restrain such rotation of said control member by said biasing means, said stop means releasing said control member responsive to a triggering impulse.

2. An apparatus as set forth in claim 1, wherein the said control member is a disk arranged lockably on a shaft parallel to said driving shaft and having at least one peripheral recess, in which the driving member can freely rotate, wherein said disk is affected by said actuating force tending to remove the recess from the zone of the driving member and to produce a positive transmission engagement between the periphery of the disk and the driving member, wherein the actuating force acting on the control member in the inoperative position thereof is produced by friction obtained by means of a friction disk (133) revolving with the driving member and acting on one side face of the disk-shaped control member.

3. An apparatus as set forth in claim 1, wherein the control member (5) actuates a force accumulator mounted on a crank and so dimensioned that the accumulator connected to the said crank is movable by the control member during one movement thereof, released by an impulse, into a position in which the accumulator is tensioned, and a second actuation of click-stop device constituting said stop means releases the accumulator (45), thereby to reinforce driving torque by the action of the said accumulator.

4. An apparatus, as set forth in claim 1, wherein said driving member is disk-shaped and is operatively associated with first and second control disks constituting control members and adapted to be actuated successively; each control disk having a respective stop means operatively associated therewith; the stop means associated with said control disk being actuatable by a cam on said first control disk; said driving member comprising two coaxial shafts of different diameters and each cooperating with a respective control disk; said control disks being alternately disengaged from said driving member and drivingly engaged with said driving member at predetermined intervals by cam control.

5. In apparatus, for controlling one or several operations as a function of a triggering impulse, of the type including a continuously rotating shaft as a driving member and wherein the triggering impulse causes a control member to be connected, for a predetermined part of the revolution of the driving member, the improvement comprising, in combination, the continuously rotating driving member and the control member having differing torque arms and being adapted to interengage directly; said control member being affected, in its inoperative position, by an actuating force tending to produce engagement with said driving member responsive to reception of a triggering impulse; said control member being a disk fixed to a shaft which is parallel to said driving shaft, and said disk having at least one peripheral recess in which the driving member can rotate freely; said disk being affected by said actuating force in a manner tending to remove said recess from the zone of said driving member and to produce a positive transmission engagement between the peripheries of said disk and said driving shaft; said actuating force being produced by a spring which is tensioned when said control member is at standstill.

6. An apparatus, as set forth in claim 5, in which the peripheral surfaces of said control disk and said driving member have frictional engagement; the frictional engagement being augmented by a gear tooth configuration of at least one of said peripheral surfaces.

7. An apparatus, as set forth in claim 6, wherein the height of the gear teeth, in the vicinity of said peripheral recess, decreases in the direction toward said peripheral recess; said peripheral recess having a widened portion positioned asymetrically with respect to the starting position of said control disk and with respect to a line intersecting the axes of said shafts and extending in the direction of rotation of said control disk from the starting position.

8. An apparatus, as set forth in claim 7, wherein said control disk cooperates with at least one releasable click-stop device, constituting said stop means and which, upon engagement with said control disk, restrains said control disk against rotation by said tensioned spring and in a position such that a peripheral recess is aligned with said driving shaft; said control disk having plural peripheral recesses and a corresponding number of stop means, which are equi-angularly distributed around the periphery of said control disk; said control disk having a diameter larger than that of said driving shaft whereby to effect a force amplification on interengagement of said control disk and said driving shaft; said control disk carrying at least one operation controlling cam.

9. An apparatus as set forth in claim 8, comprising a stop lug on the disk-shaped control member having as many stop recesses as there are peripheral recesses, and a stop pawl of the click-stop device is equipped with a tension spring producing the engagement.

10. An apparatus, as set forth in claim 8, wherein said control disk has plural peripheral recesses equi-angularly spaced around its circumference; a crank shaft having a crank pin; a gear transmission interconnecting said control disk and said crank shaft for driving of said crank shaft by said control disk; and a biasing spring connected to said crank pin; said gear transmission having a ratio to the crank pin which is equal to the reciprocal value of the angular spacing of said peripheral recesses; said stop means acting on said crank shaft.

11. An apparatus, as set forth in claim 10, wherein said crank shaft is an element of said gear transmission and has a stop stage.

12. An apparatus, as set forth in claim 10, wherein said driving member is a friction wheel mounted on said driving shaft; a driving disk fixedly secured to said driving shaft and constituting the driving disk of a clutch; said clutch including a driven member which is axially displaceable to connect and disconnect said clutch; a spring biased clutch actuating lever operable to engage said clutch; and a cam mounted on the shaft carrying said control disk and having a cam profile operably associated with said clutch actuating lever and operating said clutch actuating lever as a function of the angular position of said cam.

13. An apparatus, as set forth in claim 12, wherein when said control disk has four equi-angular spaced peripheral recesses, said cam has a cam profile including two successive sections each extending through 180°; said cam effecting different positions of said clutch actuating lever with alternate stopping of said control disk; each profile section of said cam including a respective step and a helically configured surface extending from the respective step to the other step; said clutch actuating lever having a second cam cooperable with said first-mentioned cam and including a cam profile having a single step and a helically configured surface extending through 360° from the step; said second cam being formed on the end surface of a pin on said clutch actuating lever; said first mentioned cam being formed on the end surface of a stub shaft mounting said control disk; an electromagnet operatively associated with said stop means to supply triggering impulses to the latter; said stop means comprising stop lugs and a pawl cooperable with said stop lugs; the triggering impulses having a time period shorter than the time required for movement of said pawl between two adjacent stop lugs.

14. In apparatus, for controlling one or several operations as a function of a triggering impulse, and of the type including a continuously rotating shaft as a driving member, and wherein the impulse causes a control member to be connected for a predetermined part of the rotation of the driving member, the improvement comprising, in combination, said driving member and said control members having different torque arms and being adapted for direct interengagement; said control member being effected in its inoperative position by an actuating force tending to produce engagement of said control member with said driving member responsive to receipt of a triggering impulse; said control member being a disk secured on a shaft parallel to said driving shaft, and said disk having at least one peripheral recess in which said driving member can rotate freely; said disk being affected by said actuating force tending to remove said recess from zone of said driving member to produce a positive transmission engagement between the periphery of said disk and said driving member; said actuating force being produced by friction of a friction disk rotating with said driving member and acting on one side surface of said control member; said control member being arranged non-rotatably but axially displaceable on a shaft and being affected by a spring; the surface of said friction disk remote from the direction of force of said spring being formed as a stepped projection of said friction wheel and making contact with said control member.

References Cited

UNITED STATES PATENTS

| | | | |
|---|---|---|---|
| 2,554,981 | 5/1951 | Goff | 74—84 XR |
| 2,711,237 | 6/1955 | Wylie | 192—148 XR |
| 2,781,667 | 2/1957 | Giskes | 74—214 XR |
| 2,795,150 | 6/1957 | Seidler | 74—84 XR |

MARK M. NEWMAN, Primary Examiner

A. D. HERRMANN, Assistant Examiner

U.S. Cl. X.R.

74—84, 112